Jan. 16, 1962

R. C. LOW 3,017,598

CLAMP HOLDERS

Filed Jan. 11, 1960

INVENTOR
RUSSELL C. LOW

BY H. Vincent Harsha

ATTORNEY

United States Patent Office 3,017,598
Patented Jan. 16, 1962

3,017,598

CLAMP HOLDERS

Russell Cutler Low, Rye, N.H., assignor to Raytheon Company, Waltham, Mass., a corporation of Delaware Filed Jan. 11, 1960, Ser. No. 1,766
6 Claims. (Cl. 339—75)

This invention relates to a holder for electronic components, especially for diodes, transistors and packaged crystals, and more particularly to an inexpensive clamp holder for holding a packaged crystal against loosening in its socket under vibration.

In many electronic applications it is necessary to mount electronic components, such as tubes and packaged crystals in horizontal and frequently in inverted positions. There is a tendency for a component mounted in this manner to loosen in its socket or even to fall out of its socket, particularly where there is considerable vibration or shock, as for example in moving vehicles. Component clips, brackets and other improvised methods have been used to mount packaged crystal holders and the like in an attempt to prevent disengagement of the mounted crystal from its socket when subject to shock or vibration. However, these mounting components generally fail to provide a light-weight holder capable of locking a packaged crystal securely to its socket in a manner which permits rapid disengagement of the packaged crystal from the socket.

In accordance with the clamp holder of the invention, an angle mounting bracket is provided with a mounting aperture of sufficient size to receive a well-known packaged crystal socket in which is inserted a standard packaged crystal. The portion of the bracket containing the aperture is secured to the socket while the other portion of the angle bracket extends along one side of the packaged crystal and is provided with a bearing disposed at substantially right angles to the axis of the second portion of the bracket. An extension of the bracket projects inwardly to contact one side of the packaged crystal. A support member in the form of a narrow bracket made of spring material is connected to the socket and extends along the opposite side of the packaged crystal. This support member is provided with an ear which extends over the top portion of the packaged crystal. The support member is provided with a spring loop adjacent to the socket in order to urge the ear of the support member against the top portion of the packaged crystal. A wire compression loop or bail is formed having its ends inserted into the bearing. The loop is of sufficient size to surround and form a support for the top portion of the packaged crystal. The support member is provided with a pair of detents which press against the wire loop and prevent it from slipping off the support member. In this manner, the support member is pressed against the upper portion of the packaged crystal and the wire loop is rotated over the top of the packaged crystal and is of sufficient size to urge the support member toward the extension of the bracket, thereby holding the packaged crystal in its socket and at the same time providing a mounting which absorbs vertical and horizontal shock and vibration.

Further objects and advantages of this invention will be made more apparent as the description advances reference being made now to the accompanying drawing wherein.

Figure 1:
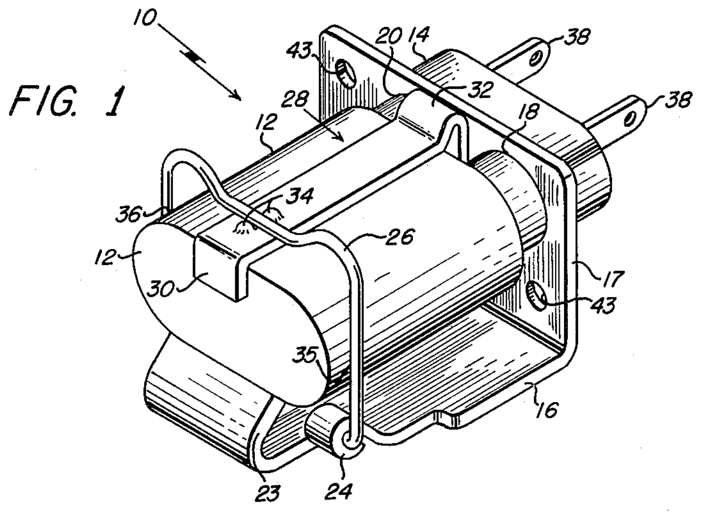
FIG. 1 is an isometric view of the clamp holder of the invention.
Figure 2:
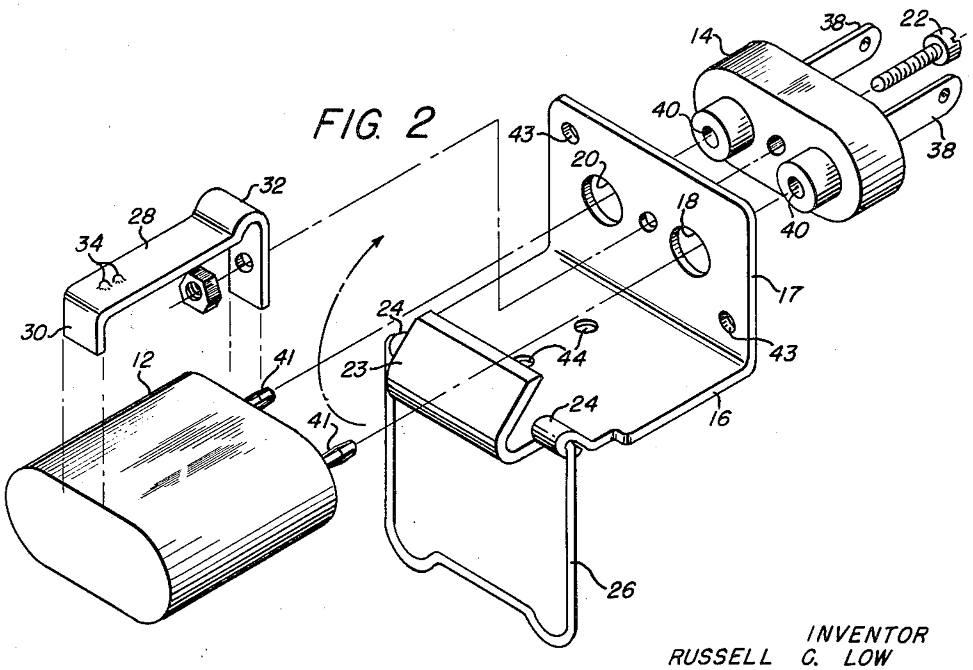
FIG. 2 is an exploded isometric view of the same clamp holder.

Referring to FIGS. 1 and 2, a clamp holder 10 is intended to hold a packaged crystal 12 in its socket 14. The clamp holder comprises an angle bracket 16, one portion extending collaterally of the packaged crystal 12 at one side thereof. The other portion 17 of the angle bracket is provided with a pair of apertures 18 and 20 through which the plug connections of socket 14 extend. The angle bracket 16 is secured to the socket 14 by means of a bolt 22 which extends through a central aperture in socket 14. The upper end of the angle bracket is bent in a manner to form bearings 24 which carry a wire compression loop or bail 26 which in the closed position, as shown in FIG. 1, surrounds the upper portion of the packaged crystal 12. The upper portion 23 of the angle bracket 16 is rolled inwardly toward one side of the packaged crystal 12 in order to maintain the packaged crystal in alignment with the socket. A spring support member 28 having one end attached to angle bracket 16 by bolt 22 extends along the opposite side of the packaged crystal and is provided with an ear 30 which extends over the top portion of the packaged crystal. A spring loop 32 integral with the support member 28 is adapted to urge the ear 30 against the top portion of the crystal package and thus hold the crystal package securely in the socket 14. The support member 28 is provided with a pair of detents 34 which receive the wire compression loop 26 after it has been rotated to hold both the support member 28 and the upper portion of the crystal package against the extended portion 23 of the angle bracket 16. It should be also noted that the opposite sides of the crystal package are in register with the wire compression loop 26 at points 35 and 36. Thus, lateral vibration is absorbed, and, vibration particularly in a direction along the line of centers formed by said apertures 18 and 20.

The wire compression loop 26, as noted, is preferably made of rigid material having a large enough diameter to compress the upper end of the packaged crystal toward the extended portion 23 of the angle bracket 16 and in such a manner as to urge the support member 28 inwardly toward the packaged crystal 12. The wire compression loop 26 may be released by being rotated to the outward or inoperative position, as shown in FIG. 2. In this manner the loop is out of the way of the packaged crystal so that the packaged crystal may be readily removed from the socket 14.

The ends of plug prong terminals 38 are appropriately shaped to form connectors which grip pins 41 extending from the packaged crystal when the pins are inserted into mating holes 40 in the socket. The angle bracket 16 is provided with mounting holes 43 and 44 for mounting the clamp holder in either a horizontal or vertical plane. The packaged crystal is mounted by plugging it in the usual manner into the crystal socket 14, depressing the spring support member 28 against the side of the packaged crystal, and positioning the wire compression loop 26 so as to surround the packaged crystal and the support member. In this manner the packaged crystal can be easily and securely mounted and locked in a position which permits rapid disengagement of the packaged crystal from the socket.

This completes the description of the invention illustrated herein. However, many modifications thereof will be apparent to persons skilled in the art without departing from the spirit and scope of this invention. Accordingly, it is desired that this invention not be limited to the particular details described herein, except as defined by the appended claims.

What is claimed is:

1. A holder for securing an electrical component to a socket comprising a socket, an electrical component inserted in said socket, an angle bracket having one end connected to said socket, a bearing at the other end of said bracket, a support member of spring material having one end connected to said socket, an ear projecting from the other end of said support member and adapted to contact the top portion of said electrical component to urge said electrical component toward said socket, and a wire loop surrounding said electrical component rotatably mounted in said bearing, said wire loop adapted to enclose said electrical component and said support member.

2. A holder for packaged crystals and similar devices comprising an angle bracket, a bearing at one end of said bracket, a support member having one end secured to the other end of said bracket and extending in the direction of said bearing, and a wire loop adapted to surround a packaged crystal rotatably mounted in said bearing, said wire loop adapted to engage the other end of said support member.

3. A holder for packaged crystals and similar devices comprising an angle bracket, a bearing at one end of said bracket, a support member having one end secured to the other end of said bracket and extending in the direction of said bearing, a wire loop rotatably mounted in said bearing, said wire loop adapted to engage the other end of said support member, said bracket extending from said bearing toward said other end of said support member, thereby to support a packaged crystal surrounded by said wire loop, an ear projecting from said other end of said support member and adapted to contact the top of the packaged crystal, and a loop of spring material integral with said support member adapted to urge said ear toward said other end of said bracket.

4. A holder for packaged crystals and similar devices comprising a bracket, a bearing at one end of said bracket, a spring support member having one end secured to the other end of said bracket and extending in the direction of said bearing, and a wire loop adapted to surround a packaged crystal rotatably mounted in said bearing, said wire loop being engageable with the other end of said support member, said bracket extending from said bearing toward said other end of said spring support member, thereby to contact and support a packaged crystal surrounded by said wire loop.

5. A holder for securing an electrical component to a socket in which the electrical component is inserted comprising a bracket having first and second portions disposed at an angle with respect to each other, the first of said portions attached to said socket, the second of said portions extending along one side of said electrical component and having a bearing adjacent to the end of said holder opposite from said socket, and an extension of said bracket in register with one side of said electrical component, a support member extending along the side of said electrical component opposite from said bracket and having an ear extending over the top portion of said electrical component, said support member having a spring loop adapted to urge the ear of said support member against the top portion of said electrical component, and a wire compression loop rotatable in said bearing and enclosing both the support member and the top portion of said electrical component, thereby to urge said electrical component in the direction of the extension of said bracket.

6. A holder for use in combination with a packaged crystal having contact prongs projecting from one end, and a socket, said holder serving to yieldably hold the packaged crystal in the socket, said holder comprising a bracket having first and second portions disposed at an angle with respect to each other, the first of said portions attached to said socket, the second of said portions extending along one side of said packaged crystal in the general direction of the insertion of said packaged crystal and having a bearing disposed at substantially right angles to the axis of said second portion of said bracket, and an extension of said bracket in register with one side of said packaged crystal, a support member made of spring material attached to said socket and extending along the opposite side of said packaged crystal and having an ear extending over the top portion of said packaged crystal, said support member further having a spring loop adjacent to the portion of said support member which is in register with the socket, said spring loop adapted to urge the ear of said support member against the top portion of said packaged crystal, and a wire compression loop rotatable in said bearing to enclose and support the top portion of said packaged crystal and said support member.

References Cited in the file of this patent

UNITED STATES PATENTS 2,265,341 Borchert ---------------- Dec. 9, 1941